(12) United States Patent
Drews et al.

(10) Patent No.: US 7,794,882 B2
(45) Date of Patent: Sep. 14, 2010

(54) ELECTRODE FOR A LITHIUM BATTERY AND METHOD FOR PRODUCING THE SAME

(75) Inventors: Juergen Drews, Pirna (DE); Gerd Fehrmann, Pirna (DE); Thomas Fischer, Pirna (DE); Thomas Hucke, Dresden (DE); Roland Staub, Berggießhübel (DE); Tim Traulsen, Pirna (DE)

(73) Assignee: Biotronik CRM Patent AG, Baar (CH)

( * ) Notice: Subject to any disclaimer, the term of this patent is extended or adjusted under 35 U.S.C. 154(b) by 658 days.

(21) Appl. No.: 11/694,079

(22) Filed: Mar. 30, 2007

(65) Prior Publication Data

US 2007/0259268 A1 Nov. 8, 2007

(30) Foreign Application Priority Data

May 6, 2006 (DE) .................. 10 2006 021 158

(51) Int. Cl.
*H01M 4/62* (2006.01)
*H01M 4/50* (2006.01)

(52) U.S. Cl. ............... 429/232; 252/182.1; 429/224; 429/217

(58) Field of Classification Search ............ 429/232
See application file for complete search history.

(56) References Cited

U.S. PATENT DOCUMENTS

| 4,285,122 | A | * | 8/1981 | Kozawa | ........... 29/623.1 |
|---|---|---|---|---|---|
| 5,308,714 | A | | 5/1994 | Crespi | |
| 5,569,558 | A | | 10/1996 | Takeuchi et al. | |
| 5,772,930 | A | | 6/1998 | Hashimoto et al. | |
| 5,807,645 | A | | 9/1998 | Takeuchi et al. | |
| 6,057,062 | A | | 5/2000 | Gan et al. | |
| 6,248,472 | B1 | | 6/2001 | Kelemen | |
| 6,447,950 | B1 | | 9/2002 | Iijima | |
| 6,451,486 | B1 | | 9/2002 | Davis et al. | |
| 6,824,924 | B1 | * | 11/2004 | Kurose et al. | ......... 429/231.95 |
| 6,828,064 | B1 | * | 12/2004 | Nardi | ............ 429/232 |
| 6,939,528 | B2 | * | 9/2005 | Davis et al. | ........... 423/605 |

(Continued)

FOREIGN PATENT DOCUMENTS

DE 69634946 T2 12/1996

(Continued)

OTHER PUBLICATIONS

Unknown, "TIMREX SFG15", date believed to be Feb. 2004, TIMCAL Ltd., Bodio, Switzerland.

(Continued)

*Primary Examiner*—Patrick Ryan
*Assistant Examiner*—Brent Thomas
(74) *Attorney, Agent, or Firm*—ARC IP Law, PC; Joseph J. Mayo

(57) ABSTRACT

The invention relates, among other things, to an electrode for a lithium battery with an electrode element of a material consisting of or comprising:

- 2-10 parts by weight of a conductivity additive containing carbon, based on an anisotropic expanded graphite;
- 0-5 parts by weight of a plate-shaped, spherical or potato-shaped graphite;
- 1-8 parts by weight of a binding agent; and
- 77-97 parts by weight of an active material selected from the group metal, transition metal oxide and metal phosphate, said active material being capable of intercalating lithium ions in a crystal lattice.

14 Claims, 2 Drawing Sheets

U.S. PATENT DOCUMENTS

2002/0197476 A1  12/2002  Mercuri et al.
2004/0023115 A1* 2/2004  Kato et al. ............... 429/231.8
2006/0083991 A1* 4/2006  Ahn et al. .................. 429/232

FOREIGN PATENT DOCUMENTS

| DE | 69906476 T2 | 7/1999 |
| DE | 19957285 A1 | 6/2001 |
| DE | 69818816 | 8/2004 |
| EP | 0170411 A1 | 5/1986 |
| EP | 0977291 A1 | 2/2000 |
| EP | 0978889 | 2/2000 |
| EP | 1035613 A | 9/2000 |
| EP | 1156541 | 11/2001 |
| JP | 57003368 | 1/1982 |
| JP | 10188993 A | 7/1998 |
| JP | 11265722 | 9/1999 |
| KR | 1020050020210 | 2/2006 |
| KR | 1020040085960 | 5/2006 |
| WO | WO 03032415 A1 | 4/2003 |

OTHER PUBLICATIONS

Unknown, "TIMREX SLP50", date believed to be Feb. 2004, TIMCAL Ltd., Bodio, Switzerland.
Unknown, "Applications for TIMREX® graphites", 2003, TIMCAL Ltd., Bodio, Switzerland.
German Search Report, Sep. 20, 2006.
European Search Report, Sep. 6, 2007.

* cited by examiner ved in the production of the electrodes because the different components have to be mixed homogeneously with each other and dried. This process is technically all the more expensive the greater the difference between the particle sizes of the materials and the greater the differences between the densities of the materials.
ELECTRODE FOR A LITHIUM BATTERY AND METHOD FOR PRODUCING THE SAME This application takes priority from German Patent Application DE 10 2006 021 158.8 filed 6 May 2006, the specification of which is hereby incorporated herein by reference.

BACKGROUND OF THE INVENTION

1. Field of the Invention

This invention relates to an electrode for a lithium battery, a method for producing the same, a lithium battery which contains the electrode according to the invention, the use of the electrode in implantable medical devices, and a powder mixture which is used in the electrode production process.

2. Description of the Related Art

In recent years the functionalities of electrically operated medical implants have steadily increased. New therapeutic possibilities have been integrated by new electronic components and even the radiocommunication of implants with external devices have been provided (telemetry function).

However, the demands on the electrical properties of batteries have also increase as a result of the additional functionalities:

- The use of batteries with a high energy density is required for miniaturising the implant in order to guarantee adequate life of the device.
- For telemetry functions of implants it is also necessary for the batteries to be able to transmit current pulses of adequate intensity and high frequency during the transmission process.
- The use of battery cases that are as thin-walled as possible is required to miniaturise the battery and minimise battery weight.

Furthermore, the battery should swell as little as possible during discharge. Swelling of the battery in a hermetically sealed implant may result in damage to components, e.g. the electronics contained therein. If a swelling battery presses from the inside against the casing of the implant, the implant may be widened undesirably. In the most unfavourable case this may result in stress cracking of the battery or implant casing.

Progressive miniaturisation of the implants requires the use of flat, prismatic batteries with a contour optimised on the basis of physiological considerations. However, prismatic batteries in particular are subject to substantial swelling since a pressure acting from the inside deforms mainly the large area end faces of the casing.

According to the state of the art the swelling of batteries is a well-known phenomenon. A typical cause of battery swelling is a density of the reaction products formed during discharge that is lower than the educts. This gives rise to an increase in volume during discharge, as is the case with lithium/iodine batteries, for example. The formation of gaseous reaction products frequently results in swelling of the battery. The formation of gaseous products in lithium batteries also depends on the moisture content of the components used in the battery. For example, water reacts with the lithium of the anode to form gaseous hydrogen. The swelling of a battery is generally also associated with an increase in impedance. This effect may be caused by gaseous substances which reduce the active surface of the of the electrodes. The swelling may also result in an increase in the distances between the anode and cathode, and hence in an increase in the impedance of the battery. The structure of porous electrodes may also be negatively influenced by swelling if, as a result of the widening of the electrode structure, the electrical contacting of the active materials is impaired by the conductivity additives contained in the electrodes.

The prevention of the formation of gaseous products inside the battery by the use of dried materials and the production of batteries in a dry atmosphere conforms to the state of the art and is also an ideal method for producing implantable batteries. However, these measures alone only give rise to a reduction in swelling.

The addition of $V_6O_{13}$ to the cathode material of lithium/manganese dioxide batteries to remedy the problem is proposed in U.S. Pat. No. 5,308,714, an addition which is able to repress the formation of gaseous reaction products. JP 57003368 discloses the addition of lanthane oxide ($La_2O_3$) or yttrium oxide ($Y_2O_3$) to the cathode material in order to reduce the swelling of the battery. These additives must be added to a previously heat treated cathode material. Further heat treatment at 100-450° C. is then required. The use of metal oxides such as $V_6O_{13}$, $La_2O_3$ or $Y_2O_3$ as additives in the active material of the cathode is always associated with a reduction in the energy density of the battery since they do not participate linearly in the electrochemical discharge reaction. Furthermore, the high costs of these compounds and their toxicity restrict their use, particularly in the medical sector.

It is also known that swelling increases in lithium batteries in which copper silver vanadium oxide, copper vanadium oxide or silver vanadium oxide is used as the cathode material if extremely finely divided carbon (soot) (is added to the cathode to improve electrical conductivity. If the proportion of conductivity additives is reduced to a value of 2% graphite and 1% soot, the swelling can be reduced (U.S. Pat. No. 5,569,558). However, the method described has only limited application since a proportion of conductivity additives totaling 3% produces only a slight improvement in the electrical conductivity of the electrode. This substantially limits the loading capacity of the cathodes per unit of area.

EP 0 978 889 describes a method for minimising the swelling by the use of a conductivity additive containing carbon, with a specific area <100 m²/g, which is added to a cathode in addition to finely divided graphite. The use of mixtures of conductivity additives represents an additional expenditure involved in the production of the electrodes because the different components have to be mixed homogeneously with each other and dried. This process is technically all the more expensive the greater the difference between the particle sizes of the materials and the greater the differences between the densities of the materials.

Electrolyte additives which are intended to help reduce the swelling of batteries have been described on several occasions. For instance, KR 1020040085960, for example, discloses that the addition of halogenated aromatic components in a quantity of 0.01 to 10% to the electrolyte will reduce a swelling in a rechargeable (secondary) battery. Electrolyte additives for reducing the swelling may also be used in implantable batteries, but their production and cleaning represent an additional cost.

JP 11265722 describes a method in which the anode material of the battery is used in a particular volume ratio to the cathode material in the battery. This will reduce the swelling of the battery to below a value of 10% related to the total thickness of the battery in that the volume released when the anode is discharged compensates for some of the battery swelling. The matching of the anode and cathode volumes can only represent a technical solution in batteries in which the reduction in volume of the anode is approximately equal, when the battery discharges, to the increase in volume of the cathode or the gas volume formed during discharge. However, in high-energy batteries for implantable devices the volume of the cathode is so high, compared to the anode, that it is impossible for the decrease in volume of the anode to compensate for the swelling of a normal battery cathode.

Design measures on battery casings for reducing the swelling of batteries have also been described. For example, KR 1020050020210 describes a prismatic casing construction from a hardened battery casing which is sealed with a lid from an extremely soft material. This will reduce the welling of the large-area end faces of the prismatic battery because the battery lid preferably bulges outwards. U.S. Pat. No. 6,248,472 also describes the use of a stabilised battery casing to reduce swelling. However, structural reinforcements of the battery casing are unsuitable for implantable batteries because they increase the weight of the battery and result in a reduction in energy density with the same battery volume. In contract a reduction in the material thickness of the casing is required to miniaturise the battery. Moreover, the deflection of the swelling in a spatial direction does not represent an applicable technical solution in hermetically sealed implants because there is insufficient clearance in any direction inside the casing.

According to EP 1 156 541 the use of fibrous cathode materials in batteries will help prevent the swelling of batteries, but the effect is described exclusively in connection with the cathode material carbon monofluoride.

SUMMARY OF THE INVENTION

The object of this invention is to provide an improved or at least alternative approach to solving the technical problems associated with battery swelling. Here the disadvantages of the state of the art approaches to these solutions, in particular, will be overcome.

According to a first aspect of the invention this object is achieved by providing a new electrode for a lithium battery. The electrode according to the invention is characterised by an electrode element which consists of material with the following composition or comprises:

| | | |
|---|---|---|
| 2-10 | parts by weight | of a conductivity additive containing carbon based on an anisotropic expanded graphite; |
| 0-5 | parts by weight | of a plate-shaped, spherical or potato-shaped graphite; |
| 1-8 | parts by weight | of a binding agent; and |
| 77-97 | parts by weight | of an active material selected from the group metal, transition metal oxide or metal phosphate, the active material being able to intercalate lithium ions in the crystal lattice. |

In addition to further structural elements, such as an electrical diverter, the electrode element is a component of the electrode and, in particular, makes available an active surface required for the electrochemical processes involved in the discharge, which surface is in contact with an electrolyte of the battery. It has been shown that an electrode modified according to the invention prevents or at least can greatly reduce swelling of the battery.

A suitable metal active material is silicon, for example. Manganese dioxide and/or silver vanadium oxide is suitable in preference as an active material from the group of off-grade metal oxides. Copper-oxyphosphate and/or vanadium-oxyphosphate are also ideal as an active material from the group of off-grade metal phosphates. According to a first preferred design the active material is manganese dioxide. The active material also preferably consists of particles with a first preferred embodiment, the active material is manganese dioxide. The active material also consists preferably of particles with a size <100 μm, in particular particles with a size ranging from 10 μm to 80 μm. The carbon content is >99.5% in a commercially available product. "TIMREX® BNB 90" from "TIMCAL Graphite and Carbon" has proved particularly suitable.

It is also preferable for the conductivity additive to consist of particles with a size ranging from D90=80 to 90 μm and D50=30 to 40 μm. The plate-shaped, spherical or potato-shaped graphite preferably consists of particles with a size ranging from 3 to 30 μm. "TIMREX® SGF 15" from the manufacturer "TIMCAL Graphite and Carbon", is suitable as a plate-shaped graphite, for example, "MCMB—meso carbon micro beads" from the manufacturer "OSAKA Gas" is suitable as spherical graphite, and "TIMREX® SLP50" from the manufacturer "TIMCAL Graphite and Carbon" is suitable as potato-shaped graphite.

The binding agent is preferably a polymer, in particular a polymer containing fluorine, such as polytetrafluoroethylene (PTFE) or polyvinylidene fluoride (PvdF).

The material preferably has a BET surface of >20 m$^2$/g. A residual moisture content of the electrode is preferably <300 ppm.

Finally, the electrode preferably has a thickness in the range of 300 μm to 6 mm, in particular in the range of 1 mm to 6 mm.

A second aspect of the invention is based on a method for producing an electrode for a lithium battery. The method according to the invention comprises the stages:

(i) Provision of a powder mixture containing or consisting of:

| | | |
|---|---|---|
| 2-10 | parts by weight | of a conductivity additive containing carbon, based on an anisotropic expanded graphite; |
| 0-5 | parts by weight | of a plate-shaped, spherical or potato-shaped graphite; |
| 1-8 | parts by weight | of a binding agent; and |
| 77-97 | parts by weight | of an active material selected from the group metal, transition metal oxide and metal phosphate, the active material being capable of intercalating lithium ions in the crystal lattice; and |

(ii) Solidification of the powder mixture to form an electrode element for the electrode.

The powder mixture is, in particular, pressed into cathodes by means of a pressing process during which an electrically conductive diverter, e.g. a metal lattice or a metal foil, is incorporated. Alternatively, the powder mixture may also be further processed into a dispersion if a dispersed binding agent is used and applied to an electrically conducting diverter by means of a wet coating process, then dried.

The method preferably also comprises the step below, following step (ii):

(iii) Drying of the electrode element until a residual water content <300 ppm is obtained.

A pressure ranging from 10$^{-2}$ to 10$^{-3}$ mbars and a temperature ranging from 20° to 350° C. preferably prevail in step (iii). Complete elimination of battery swelling during discharge can be achieved by a combination of correct choice of material for producing the electrodes and the drying process.

According to a third aspect of the invention a lithium battery is provided which contains the electrode according to the invention designed as a cathode, as described above. The lithium battery is preferably designed for basic load discharge currents <100 μA and pulse discharge currents ranging from 1-100 mA. It is also preferable for an anode to contain metal lithium or to consist of metal lithium.

It is also preferable for the lithium battery to contain a non-aqueous organic solvent as electrolyte, which is able to dissolve a conducting salt containing lithium. The solvent is preferably selected from one or a plurality of solvents in the group (i) organic carbonates, in particular ethylene carbonate, propylene carbonate, dimethyl carbonate, diethyl carbonate or ethyl methyl carbonate; and (ii) ethers, in particular diethoxyethane or dimethoxyethane.

The conducting salt is preferably selected from the group lithium perchlorate, lithium tetrafluoroborate, lithium hexafluoroarsenate and lithium-bis-oxalatoborate. The conducting salt is preferably present in a concentration of approximately 1 mol/l in the electrolyte.

A fourth aspect of the invention is based on the use of the lithium battery according to the invention in medical implants, in particular in heart pacemakers or defibrillators.

Batteries for implantable devices are divided into three categories:

| Category | Typical discharge currents (basic load) | Typical discharge currents (pulse) |
| --- | --- | --- |
| low-rate | <100 μA | — |
| medium-rate | <100 μA | 1-100 mA |
| high-rate | <100 μA | >1000 mA |

The lithium battery according to the invention is ideally suited for producing gas-tight, prismatic medium-rate batteries for implantable medical devices.

The shape of the electrode can be largely adapted to the requirements of the device to be implanted. The thickness of the electrode is preferably between 300 μm and 6 mm, particular preference being given to electrode thicknesses of between 1 and 4 mm.

Because of the elimination or substantial reduction in battery swelling during discharge the medical implant can be miniaturised substantially because no consideration need be given to clearance for the increase in volume of a swelling battery inside the implant casing. Due to elimination of the swelling no components inside the implant can be mechanically damaged. Since there is no increase in volume inside the battery there is no mechanical loading of the battery casing, and the integrity of the battery casing and welded seals is not impaired. There is improved operational reliability of the implant.

Because of the elimination of the swelling extremely thin-walled casings may be used, resulting in an additional increase in energy density. Furthermore, the solution according to the invention allows the design of prismatic casings with extremely large end faces. The elimination of battery swelling enables new design principles to be applied for implantable devices. For example, electronic components of the implant can be placed directly on the battery casing as they cannot be damaged by swelling of the battery.

A fifth aspect of the invention is based on the powder mixture used as the initial product in the method of producing the lithium battery. The powder mixture consists of or contains:

| | |
| --- | --- |
| 2-10 parts by weight | of a conductivity additive containing carbon, based on an anisotropic expanded graphite; |
| 0-5 parts by weight | of a plate-shaped, spherical or potato-shaped graphite; |
| 1-8 parts by weight | of a binding agent; and |
| 77-97 parts by weight | of an active material selected from the group metal, transition metal oxide and metal phosphate, the active material being capable of intercalating lithium ions in the crystal lattice. |

BRIEF DESCRIPTION OF THE DRAWINGS

The invention is explained in greater detail in the following with reference to an exemplary embodiment and the associated drawings, in which.

DETAILED DESCRIPTION OF THE INVENTION

Figure 1:
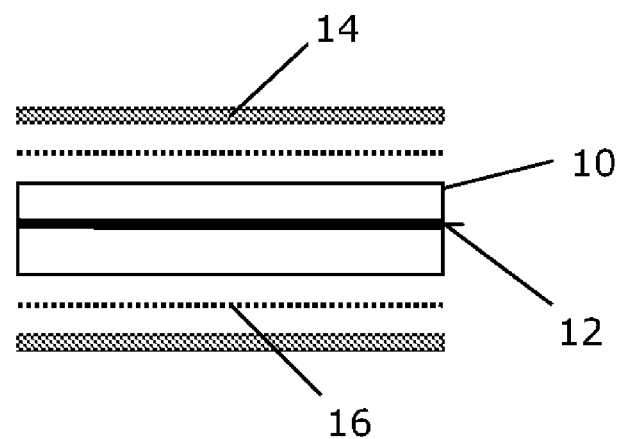
FIG. 1 shows a diagrammatic sectional view to illustrate the basic construction of the lithium battery according to the invention.

FIG. 1 serves to illustrate the basic structure of a lithium battery modified according to the invention. A cathode 10 has an electrically conducting diverter 12 consisting of a material that conducts electricity well. Diverter 12 may be provided in the form of a diverter lattice. Cathode 10 is provided with lithium anodes 14 on both sides, a separator 16 being arranged between cathode 10 and lithium anodes 14.

To produce a cathode 10 for a pacemaker or defibrillator 91% by weight of manganese dioxide is mixed homogeneously with 7% by weight of an expanded graphite and 2% by weight of a PTFE powder in a powder mixer. A press mould, which has a cavity which is complementary to the shape of the electrode and in which diverter 12 is arranged approximately in the centre, is fed with the powder mixture and the powder mixture is pressed with diverter 12. When used in pacemakers or defibrillators cathode 10 should be approximately 3.5 mm thick. The total area of cathode 10 should be approximately 10 cm$^2$. After pressing, cathode 10 is dried for at least 1 h at a temperature of 270° C.-300° C. and a pressure of 10$^{-3}$ mbars. Cathode 10 is then provided on both sides with lithium anode 14 of the same shape. A microporous membrane of a polyolefin or a ceramic material serves as separator 16.

Figure 2A:
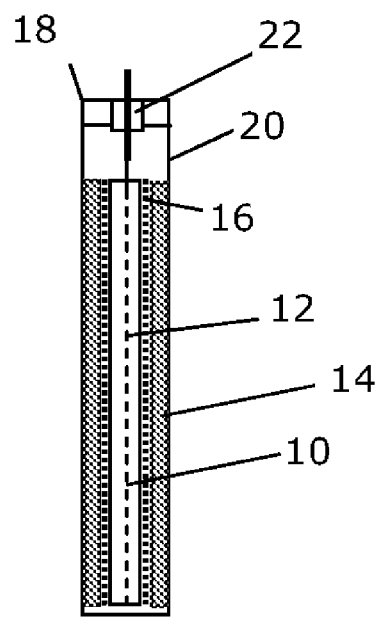
FIGS. 2A-B show a battery with a casing in a diagrammatic sectional representation and in elevation.
Figure 2B:
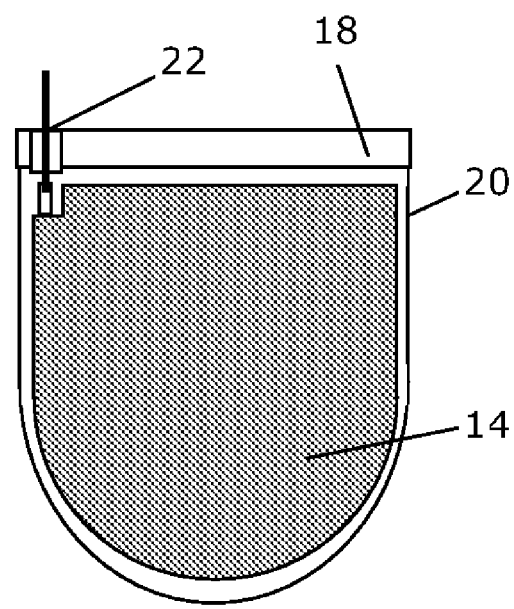

FIGS. 2A and 2B show the structure of the battery in a diagrammatic sectional representation and elevation. The battery components described above, cathode 10, lithium anodes 14 and separator 16, are welded into a battery casing 20 of high grade steel with a wall thickness of 0.3 mm, anodes 14 being connected in an electrically conducting manner to battery casing 20. Cathode 10 was guided through a lid 18 of battery casing 20 by means of a gas-tight, electrically insulating glass-metal opening 22. The battery is then filled with an electrolyte of ethylene carbonate/propylene carbonate/diethoxyethane (mixing ratio 1:1:1) and 1 M of lithium perchlorate, then sealed gas-tight.

Figure 3:
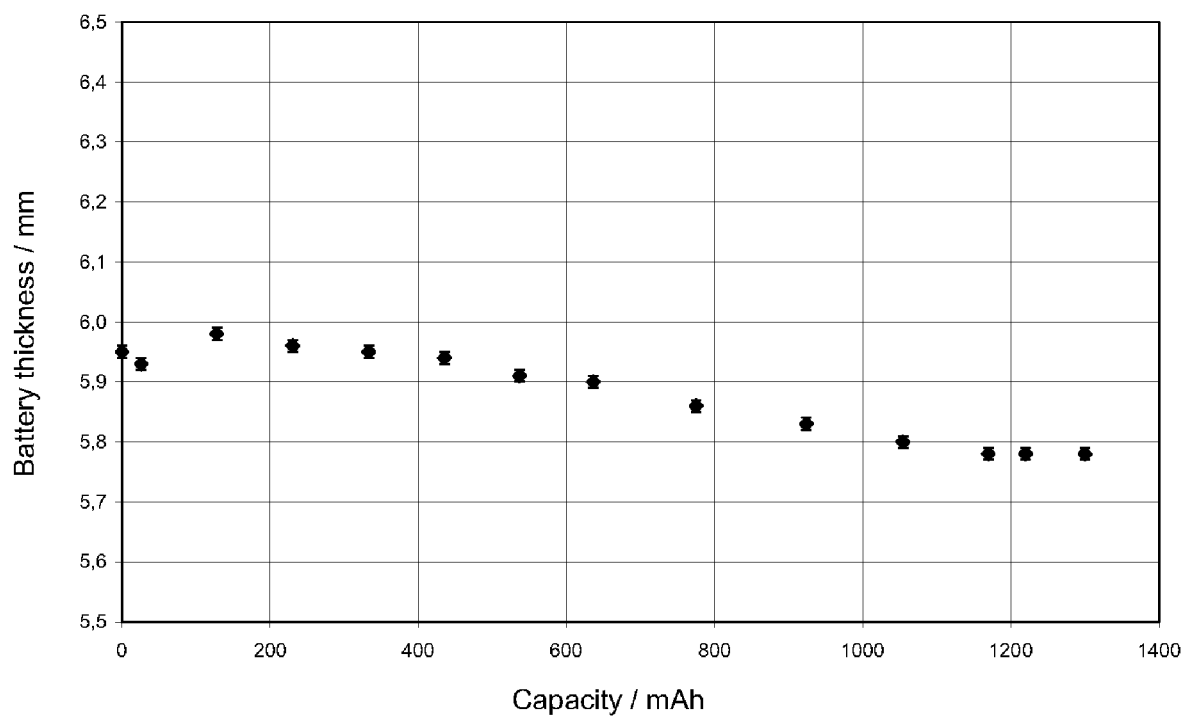
FIG. 3 shows a graphic representation of the battery thickness as a function of the depth of discharge.

FIG. 3 shows the course of the battery thickness as a function of the discharge depth. The nominal thickness of the battery was 6 mm. The figure shows that no swelling occurs during discharge. It is even apparent that the thickness of the battery decreases slightly. The accuracy of the measurement is indicated as 0.005 mm.

What is claimed is:

1. An electrode for a lithium battery with an electrode element of a material comprising:

| | |
|---|---|
| 2-10 parts by weight | of a conductivity additive containing carbon, based on an anisotropic expanded graphite wherein said conductivity additive consists of particles of size D90 = 80 to 90 μm and D50 = 30 to 40 μm; |
| 0-5 parts by weight | of a plate-shaped, spherical or potato-shaped graphite wherein said plate-shaped, spherical or potato-shaped graphite consists of particles with a size ranging from 3 to 30 μm; |
| 1-8 parts by weight | of a binding agent; |
| 77-97 parts by weight | of an active material selected from the group metal, transition metal oxide and metal phosphate, said active material being capable of intercalating lithium ions in a crystal lattice wherein said active material has a BET surface of >20 m$^2$/g; |
| 0-300 ppm | of moisture content; and, | wherein said active material is 91% by weight of manganese dioxide and wherein said conductivity additive is 7% by weight of said anisotropic expanded graphite and wherein said binding agent is 2% by weight of PTFE powder and wherein a thickness of said lithium battery decreases when a depth of discharge of said lithium battery increases.

2. The electrode according to claim 1, wherein said binding agent is a polymer.

3. The electrode according to claim 2, wherein said polymer contains fluorine.

4. The electrode according to claim 3, wherein said polymer is polytetrafluoroethylene (PTFE) or polyvinylidene fluoride (PvdF).

5. The electrode according to claim 1, wherein said electrode has a thickness ranging from 300μ to 6 mm.

6. The electrode according to claim 5, wherein said thickness of the electrode ranges from 1 mm to 6 mm.

7. The electrode according to claim 1 wherein said lithium battery comprises a cathode coupled with said electrode material.

8. The electrode according to claim 7 wherein said lithium battery is designed for basic load discharge currents <100 μA and pulse discharge currents ranging from 1-100 mA.

9. The electrode according to claim 7, wherein said lithium battery comprises an anode contains metal lithium or consists of metal lithium.

10. The electrode according to claim 7, wherein said lithium battery contains a non-aqueous organic solvent as electrolyte, which is able to dissolve a conducting salt containing lithium.

11. The electrode according to claim 10, wherein said solvent is selected from one or a plurality of solvents from a group of:
 (i) organic carbonates, in particular ethylene carbonate, propylene carbonate, dimethyl carbonate, diethyl carbonate or ethyl methyl carbonate; and
 (ii) ethers, in particular diethoxyethane or dimethoxyethane.

12. The electrode according to claim 10, wherein said conducting salt is selected from the group lithium perchlorate, lithium tetraflouoroborate, lithium hexafluoroarsenate and lithium-bis-oxalatoborate.

13. The electrode according to claim 10, wherein said conducting salt is present in said electrolyte in a concentration of approximately 1 mol/l.

14. A powder mixture for producing an electrode for a lithium battery comprising:

| | |
|---|---|
| 2-10 parts by weight | of a conductivity additive containing carbon, based on an anisotropic expanded graphite wherein said conductivity additive consists of particles of size D90 = 80 to 90 μm and D50 = 30 to 40 μm; |
| 0-5 parts by weight | of a plate-shaped, spherical or potato-shaped graphite wherein said plate-shaped, spherical or potato-shaped graphite consists of particles with a size ranging from 3 to 30 μm; |
| 1-8 parts by weight | of a binding agent; |
| 77-97 parts by weight | of an active material selected from the group metal, transition metal oxide and metal phosphate, said active material being capable of intercalating lithium ions in a crystal lattice wherein said active material has a BET surface of >20 m$^2$/g; |
| 0-300 ppm | of moisture content; and, | wherein said active material is 91% by weight of manganese dioxide and wherein said conductivity additive is 7% by weight of said anisotropic expanded graphite and wherein said binding gent is 2% by weight of PTFE powder and wherein a thickness of said lithium battery decreases when a depth of discharge of said lithium battery increases.

\* \* \* \* \*